(12) United States Patent
Tatsumisago et al.

(10) Patent No.: US 9,537,174 B2
(45) Date of Patent: Jan. 3, 2017

(54) SULFIDE SOLID ELECTROLYTE

(75) Inventors: Masahiro Tatsumisago, Sakai (JP); Akitoshi Hayashi, Sakai (JP); Shigenori Hama, Susono (JP); Koji Kawamoto, Susono (JP); Takamasa Ohtomo, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 964 days.

(21) Appl. No.: 13/389,129

(22) PCT Filed: Aug. 31, 2010

(86) PCT No.: PCT/JP2010/064837
§ 371 (c)(1),
(2), (4) Date: Mar. 23, 2012

(87) PCT Pub. No.: WO2011/030696
PCT Pub. Date: Mar. 17, 2011

(65) Prior Publication Data
US 2012/0189918 A1 Jul. 26, 2012

(30) Foreign Application Priority Data
Sep. 9, 2009 (JP) .................... 2009-208227

(51) Int. Cl.
*H01M 10/0562* (2010.01)
*H01M 10/0525* (2010.01)

(52) U.S. Cl.
CPC ..... *H01M 10/0562* (2013.01); *H01M 10/0525* (2013.01); *H01M 2300/0071* (2013.01); *Y02E 60/122* (2013.01); *Y02P 70/54* (2015.11)

(58) Field of Classification Search
CPC ............ H01M 10/052; H01M 10/0565; H01M 10/0562; H01M 2300/0065; H01M 2300/0071

See application file for complete search history.

(56) References Cited

U.S. PATENT DOCUMENTS

| 5,500,291 | A | 3/1996 | Minami et al. |
| 2007/0160911 | A1 | 7/2007 | Senga et al. |
| 2007/0196739 | A1 | 8/2007 | Seino et al. |
| 2011/0167625 | A1 | 7/2011 | Hama et al. |

FOREIGN PATENT DOCUMENTS

| EP | 1 365 470 A1 | 11/2003 |
| EP | 2 403 046 A1 | 1/2012 |
| JP | A-60-84772 | 5/1985 |
| JP | A-06-271332 | 9/1994 |
| JP | A-6-279049 | 10/1994 |
| JP | A-07-330312 | 12/1995 |
| KR | 10-2005-0009170 A | 1/2005 |
| WO | WO 2005/040039 A1 | 5/2005 |
| WO | WO 2010/038313 A1 | 4/2010 |
| WO | WO 2010/098177 A1 | 9/2010 |

OTHER PUBLICATIONS

Machida et al., "Mechano-chemical Synthesis of Lithium Ion Conducting Materials in the System $Li_2O$-$Li_2S$-$P_2S_5$," *J. Jpn. Soc. Powder Powder Metallurgy*, 2004, vol. 51, No. 2, pp. 91-97.
International Search Report in International Application No. PCT/JP2010/064837; dated Oct. 12, 2010 (with English-language translation).
Hayashi et al., "Development of Sulfide Glass-Ceramic Electrolytes for All-Solid-State Lithium Rechargeable Batteries," *J Solid State Electrochem.*, 2010, vol. 14, pp. 1761-1767.
Minami et al., "Structure and properties of the $70Li_2S\cdot(30-x)P_2S_5\cdot xP_2O_5$ oxysulfide glasses and glass-ceramics," *Journal of Non-Crystalline Solids*, 2008, pp. 370-373, vol. 354, Published by Elsevier B.V.
Rao et al., "Oxysulfide glasses $xLi_2O\text{-}(1-x)(0.6Li_2S\text{-}0.4P_2S_5)$," *Journal of Power Sources*, 2006, pp. 258-262, vol. 159, Published by Elsevier B.V.
Ohtomo et al., "Electrical and electrochemical properties of $Li_2S$—$P_2S_5$—$P_2O_5$ glass-ceramic electrolytes," *Journal of Power Sources*, 2005, pp. 715-718, vol. 146, Published by Elsevier B.V.

*Primary Examiner* — Ula C Ruddock
*Assistant Examiner* — Thomas Parsons
(74) *Attorney, Agent, or Firm* — Oliff PLC

(57) ABSTRACT

A sulfide solid electrolyte with excellent ion conductivity and a method for producing a crystallized glass contained in the sulfide solid electrolyte. A sulfide solid electrolyte comprising a crystallized glass represented by the following chemical formula $yLi_2S\cdot(100\text{-}x\text{-}y)P_2S_5\cdot xP_2O_5$, wherein $0<x<25$ and $67<y<80$.

12 Claims, 3 Drawing Sheets

SULFIDE SOLID ELECTROLYTE

TECHNICAL FIELD

The present invention relates to a sulfide solid electrolyte with excellent ion conductivity and a method for producing a crystallized glass contained in the sulfide solid electrolyte.

BACKGROUND ART

A secondary battery is a battery which is able to provide electricity by converting a loss in chemical energy into electrical energy; moreover, it is a battery which is able to store (during charge) chemical energy by converting electrical energy into chemical energy by passing an electrical current in a direction that is opposite to the discharge direction. Among secondary batteries, lithium ion batteries have higher energy density, so that they are widely used as a power source for notebook personal computers, cellular phones, etc.

In a lithium secondary battery using graphite ($C_6$) as the negative electrode active material, the reaction described by the following formula (I) proceeds at the negative electrode upon discharge:

$$C_6Li \rightarrow C_6 + Li^+ + e^- \qquad (I)$$

An electron produced by the formula (I) passes through an external circuit, works by an external load, and then reaches the positive electrode. At the same time, a lithium ion ($Li^+$) produced by the formula (I) is transferred through the electrolyte sandwiched between the negative and positive electrodes from the negative electrode side to the positive electrode side by electro-osmosis.

When lithium cobaltate ($Li_{0.4}CoO_2$) is used as a positive electrode active material, a reaction described by the following formula (II) proceeds at the positive electrode upon discharge:

$$Li_{0.4}CoO_2 + 0.6Li^+ + 0.6e^- \rightarrow LiCoO_2 \qquad (II)$$

Upon charging the battery, reactions which are reverse to the reactions described by the above formulae (I) and (II) proceed at the negative and positive electrodes. The graphite material in which lithium was intercalated ($C_6Li$) becomes reusable at the negative electrode, while lithium cobaltate ($Li_{0.4}CoO_2$) is regenerated at the positive electrode. Because of this, discharge becomes possible again.

Among lithium secondary batteries, a lithium secondary battery all-solidified by using a solid electrolyte as the electrolyte, uses no combustible organic solvent in the battery; therefore, it is considered to be safe, able to simplify the device and excellent in production cost and productivity. A sulfide solid electrolyte is known as a solid electrolyte material used for such a lithium secondary battery.

Many sulfide solid electrolyte-related techniques have been developed so far. A technique is disclosed in Non-patent Literature 1, relating to a sulfide solid electrolyte which has an amorphous structure and is represented by the following chemical formula: $75\{(1-x)Li_2O.xLi_2S\}.25P_2S_5$.

CITATION LIST

Non-patent Literature 1: J. Jpn. Soc. Powder and Powder Metallurgy, 51 (2004) 91-97

SUMMARY OF INVENTION

Technical Problem

In Non-patent Literature 1, a change in ion conductivity derived from the chemical structure of the electrolyte, is not discussed at all.

The present invention was achieved in light of the above circumstance. An object of the present invention is to provide a sulfide solid electrolyte with excellent ion conductivity and a method for producing a crystallized glass contained in the sulfide solid electrolyte.

Solution to Problem

The sulfide solid electrolyte of the present invention comprises a crystallized glass represented by the following chemical formula (1):

$$yLi_2S.(100-x-y)P_2S_5.xP_2O_5 \qquad (1)$$

wherein $0 < x < 25$ and $67 < y < 80$.

The sulfide solid electrolyte of such a structure comprises the crystallized glass having the composition represented by the above formula (1), so that lithium ion conducting paths are formed more orderly compared with a sulfide solid electrolyte which only consists of an amorphous glass having the composition represented by the above formula (1). Therefore, the sulfide solid electrolyte of such a structure can exercise higher lithium ion conducting ability than the sulfide solid electrolyte which only consists of the amorphous glass. Also, because the sulfide solid electrolyte of such a structure contains a crystalline glass which has an ortho composition and contains no crosslinking sulfur, it can decrease hydrogen sulfide generation.

In the sulfide solid electrolyte, the crystallized glass preferably has a crystallinity of 50 to 100%.

The sulfide solid electrolyte of such a structure can fully exercise lithium ion conducting ability by having moderately-ordered lithium ion conducting paths.

The sulfide solid electrolyte of the present invention preferably has an ortho composition.

The sulfide solid electrolyte of the present invention preferably has a $PS_4^{3-}$ ion.

The method for producing a crystallized glass of the present invention comprises the steps of: preparing a raw material composition comprising $Li_2S$, $P_2S_5$ and $P_2O_5$ so that a content of $Li_2S$ is in the range of 67 mol % to 80 mol % when a total content of $Li_2S$, $P_2S_5$ and $P_2O_5$ is 100 mol %; amorphizing the raw material composition; and crystallizing a glass obtained by the amorphization step by heating.

The crystallized glass which can be used for the sulfide solid electrolyte of the present invention, can be produced by the crystallized glass production method having such steps. Also, the crystallized glass production method having such steps can produce a crystallized glass having an ortho composition by allowing the $Li_2S$ content in the raw material composition to be in the range of 67 mol % to 80 mol % in the raw material composition production step.

Advantageous Effects of Invention

According to the present invention, the sulfide solid electrolyte of such a structure comprises the crystallized glass having the composition represented by the above formula (1), so that lithium ion conducting paths are formed more orderly compared with a sulfide solid electrolyte which only consists of an amorphous glass having the composition represented by the above formula (1). Therefore, the sulfide solid electrolyte of such a structure can exercise higher lithium ion conducting ability than the sulfide solid electrolyte which only consists of the amorphous glass. Also, according to the present invention, because the sulfide solid electrolyte of such a structure comprises a crystalline glass which has an ortho composition and contains no crosslinking sulfur, it can decrease hydrogen sulfide generation.

DESCRIPTION OF EMBODIMENTS

DESCRIPTION OF EMBODIMENTS

1. Sulfide Solid Electrolyte

Figure 1:
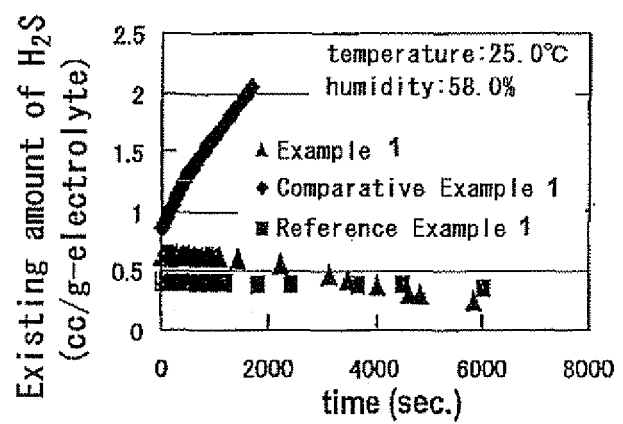
FIG. 1 is a graph showing the amount of hydrogen sulfide generated from the sulfide solid electrolyte of Example 1, that of Comparative Example 1 and that of Reference Example 1.

The sulfide solid electrolyte of the present invention comprises a crystallized glass represented by the following chemical formula (1):

$$yLi_2S \cdot (100-x-y)P_2S_5 \cdot xP_2O_5 \quad (1)$$

wherein 0<x<25 and 67<y<80.

A glass obtained by replacing a part of $P_2S_5$ of the composition thereof, $yLi_2S \cdot (100-y)P_2S_5$ (wherein 67<y<80), by $P_2O_5$, that is, the glass represented by the formula (1), has an ortho composition, so that it is thought to have high stability to water and generate a small amount of hydrogen sulfide.

"Ortho" refers to, among oxo acids obtained by hydration of one oxide, one having the highest hydration degree, generally. In $Li_2S$—$P_2S_5$ sulfide solid electrolytes including the sulfide solid electrolyte of the present invention, a crystal composition in which $Li_2S$ is mostly attached to $P_2S_5$, that is, $Li_3PS_4$ corresponds to the ortho composition. In the case of $Li_2S$—$P_2S_5$ sulfide solid electrolytes, $Li_2S$ in the sulfide solid electrolyte of the ortho composition has a mole fraction of 67 to 80%, preferably 75%.

The crystallized glass used for the sulfide solid electrolyte of the present invention has the ortho composition because, as shown in the above formula (1), the mole fraction of the total $Li_2S$ is 67 to 80% of the whole crystallized glass. As a result, the crystallized glass has substantially no crosslinking sulfur. Therefore, the amount of hydrogen sulfide generated from the sulfide solid electrolyte of the present invention containing the crystallized glass, is small.

"Crosslinking sulfur" refers to a sulfur which forms a bridge between two phosphorus atoms of $S_3P$—S—$PS_3$, which is obtained by reaction of $Li_2S$ and $P_2S_5$. Such a crosslinking sulfur is likely to react with water and thus to generate hydrogen sulfide.

As described in "Examples" described below, it was confirmed by Raman spectrum measurement that the sulfide solid electrolyte of the present invention contains substantially no crosslinking sulfur. Generally in Raman spectra, a peak of $S_3P$—S—$PS_3$ appears at 402 cm$^{-1}$. As shown below, in the Raman spectra of the sulfide solid electrolyte of the present invention, no peak was observed at 402 cm$^{-1}$. Also in the Raman spectra of the sulfide solid electrolyte of the present invention, a peak assigned to $PS_4^{3-}$ (417 cm$^{-1}$) was observed.

The glass contained in the sulfide solid electrolyte of the present invention is a crystallized glass in which any of the composition of the crystalline portion and that of the amorphous portion is represented by the formula (1). The sulfide solid electrolyte of the present invention comprises the crystallized glass of such a composition, so that lithium ion conducting paths are formed more orderly compared with a sulfide solid electrolyte which only consists of an amorphous glass having the composition represented by the above formula (1). Therefore, the sulfide solid electrolyte of the present invention can exercise higher lithium ion conducting ability than the sulfide solid electrolyte which only consists of the amorphous glass.

The crystallized glass used for the present invention preferably has a crystallinity of 50 to 100%. If the crystallinity is less than 50%, the order of the lithium ion conducting paths may be disrupted and no desired lithium ion conductivity may be obtained, therefore. The crystallized glass used for the present invention preferably has a crystallinity of 70 to 100%, more preferably 90 to 100%.

In the formula (1), x is preferably 3≤x≤20. If x<3, the content of $P_2O_5$ in the crystallized glass structure is too low, so that the amount of generated hydrogen sulfide may not be sufficiently decreased. If X>20, the content of $P_2S_5$ in the crystallized glass structure is too low, so that sufficient lithium ion conductivity may not be obtained.

Also, x is more preferably 5≤x≤20, still more preferably 5≤x≤15.

In a predetermined hydrogen sulfide amount measuring test, the amount of hydrogen sulfide generated from the sulfide solid electrolyte of the present invention within 6,000 seconds after the beginning of the measurement, is preferably 0.5 cc/g or less, more preferably 0.45 cc/g or less, still more preferably 0.4 cc/g or less, and particularly preferably 0.35 cc/g or less. Because of producing a small amount of hydrogen sulfide, the sulfide solid electrolyte of the present invention can be a sulfide solid electrolyte material with higher safety.

The hydrogen sulfide amount measuring test refers to the following test: 100 mg of sulfide solid electrolyte material is weighed out in an argon atmosphere; the weighed sample is pressed at a pressure of 5.1 ton/cm$^2$ with a pelleting machine having a pelleting part of 1 cm$^2$ to form a pellet. Then, the pellet is placed in a desiccator (1,950 cc). After the desiccator having the pellet placed therein is once evacuated, air at a temperature of 25° C. and a humidity of 58% is introduced thereinto. The amount of hydrogen sulfide generated in the first 6,000 seconds is measured by a hydrogen sulfide sensor.

The sulfide solid electrolyte of the present invention preferably has an Li ion conductivity of $10^{-5}$ S/cm or more, more preferably $10^{-4}$ S/cm or more. The sulfide solid electrolyte of the present invention is generally in a powder form and has an average particle diameter in the range of 0.1 to 100 μm, for example. The sulfide solid electrolyte of the present invention has applications such as a lithium battery application.

2. Crystallized Glass Production Method

The method for producing a crystallized glass of the present invention comprises the steps of: preparing a raw material composition comprising $Li_2S$, $P_2S_5$ and $P_2O_5$ so that a content of $Li_2S$ is in the range of 67 mol % to 80 mol % when a total content of $Li_2S$, $P_2S_5$ and $P_2O_5$ is 100 mol %; amorphizing the raw material composition; and crystallizing a glass obtained by the amorphization step by heating.

Hereinafter, the method for producing the crystallized glass (sulfide solid electrolyte material) of the present invention will be described in order. In the present invention, it is preferable to conduct the below-described steps in an inert gas atmosphere (such as Ar gas atmosphere).

2-1. Raw Material Composition Preparation Step

The raw material composition preparation step of the present invention is a step of preparing a raw material composition comprising $Li_2S$, $P_2S_5$ and $P_2O_5$ so that a content of $Li_2S$ is in the range of 67 mol % to 80 mol % when a total content of $Li_2S$, $P_2S_5$ and $P_2O_5$ is 100 mol %. By allowing the $Li_2S$ content in the raw material composition to be in the range of 67 mol % to 80 mol %, preferably 75 mol %, a crystallized glass can be obtained through the below described amorphizing and crystallizing steps.

The raw material composition used for the production method of the present invention comprises $Li_2S$, $P_2S_5$ and $P_2O_5$. In addition, the raw material composition can contain other compound.

From the viewpoint of preventing a side reaction, $Li_2S$ contained in the raw material composition preferably has a small amount of impurities. To synthesize $Li_2S$, there may be mentioned a method disclosed in Japanese Patent Application Laid-Open (JP-A) No. H7-330312, for example. Moreover, $Li_2S$ is preferably purified by a method disclosed in WO2005/040039, for example.

As $P_2S_5$ and $P_2O_5$, commercially available products or those synthesized and purified by a general method, can be used.

In addition to $Li_2S$, $P_2S_5$ and $P_2O_5$, the raw material composition can also contain a lithium orthooxo acid such as $Li_3PO_4$. A more stable sulfide solid electrolyte can be obtained by adding such a lithium orthooxo acid.

2-2. Amorphizing Step

The amorphizing step of the present invention is a step of amorphizing the raw material composition. A sulfide glass is generally obtained by this step. As the amorphizing step, for example, there may be mentioned a mechanical milling method and a melting and rapid-quenching method. Preferred is a mechanical milling method, from the point of view that normal-temperature processing and production process simplification are possible.

Mechanical milling is not particularly limited as long as it is a method that can mix the raw material composition, providing mechanical energy. For example, there may be mentioned ball milling, turbo milling, mechanofusion and disk milling. Preferred is ball milling. From the point of view that a glass having an ortho composition can be efficiently obtained, planetary ball milling is preferred.

It is preferable to determine the various conditions of mechanical milling so that a glass having an ortho composition and containing substantially no crosslinking sulfur can be obtained. For example, to synthesize a glass having an ortho composition by planetary ball milling, the raw material composition and grinding balls are placed in a pot and treated at a predetermined rotational frequency for a predetermined time. In general, the higher the rotational frequency, the faster the rate of production of the glass having an ortho composition; moreover, the longer the treatment time, the higher the conversion rate from the raw material composition to the glass having an ortho composition. To perform planetary ball milling, the rotational frequency is, for example, in the range of 200 rpm to 500 rpm, more preferably in the range of 250 rpm to 400 rpm. The treatment time is, for example, in the range of 1 hour to 100 hours, preferably in the range of 1 hour to 50 hours.

2-3. Crystallizing Step

In the present invention, the crystallizing step is a step of crystallizing the glass obtained by the amorphizing step by heating. A crystallized sulfide glass can be obtained through this step. There is a possibility that crosslinking sulfur will be produced or a metastable phase will be produced depending on the heat treatment condition. To prevent such a problem, in the present invention, it is preferable to conduct a heat treatment at a temperature of 180 to 400° C. for 30 seconds to 10 hours.

The sulfide solid electrolyte of the present invention can be obtained by using the crystallized glass obtained by the crystallized glass production method and, for example, mixing the crystallized glass with an additive having lithium ion conductivity, as needed.

The present invention is not limited by the above-mentioned embodiments. The above-mentioned embodiments are examples, and any that has the substantially same essential features as the technical ideas described in claims of the present invention and exerts the same effects and advantages is included in the technical scope of the present invention.

EXAMPLES

1. Production of Sulfide Solid Electrolyte

Example 1

Lithium sulfide ($Li_2S$), diphosphorus pentasulfide ($P_2S_5$) and diphosphorus pentoxide ($P_2O_5$) were used as the starting materials. These powdery materials were weighed out in a glove box under an argon atmosphere so as to have a mole ratio of $75Li_2S:15P_2S_5:10P_2O_5$. The weighed materials were mixed with an agate mortar to obtain a raw material composition.

Next, 1 g of the raw material composition was placed into a 45 ml zirconia pot. In addition, 500 zirconia balls (Φ4 mm) were placed into the pot. The pot was completely hermetically closed and installed in a planetary ball mill to perform mechanical milling at a rotational frequency of 510 rpm for 20 hours, thereby obtaining a glass having an ortho composition.

Then, the glass was subjected to a heat treatment in the condition of 290° C. and two hours under an argon atmosphere. Therefore, a sulfide solid electrolyte (crystallized glass) of Example 1 was obtained.

Comparative Example 1

Lithium sulfide ($Li_2S$) and diphosphorus pentasulfide ($P_2S_5$) were used as the starting materials. These powdery materials were weighed out in a glove box under an argon atmosphere so as to have a mole ratio of $75Li_2S:25P_2S_5$. The weighed materials were mixed with an agate mortar to obtain a raw material composition.

Next, 1 g of the raw material composition was placed into a 45 ml zirconia pot. In addition, 500 zirconia balls (Φ4 mm) were placed into the pot. The pot was completely hermetically closed and installed in a planetary ball mill to perform mechanical milling at a rotational frequency of 510 rpm for 20 hours. Therefore, a sulfide solid electrolyte (amorphous glass) of Comparative Example 1 was obtained.

Reference Example 1

Lithium sulfide ($Li_2S$), diphosphorus pentasulfide ($P_2S_5$) and diphosphorus pentoxide ($P_2O_5$) were used as the starting materials. These powdery materials were weighed out in a glove box under an argon atmosphere so as to have a mole ratio of 75Li$_2$S:15P$_2$S$_5$:10P$_2$O$_5$. The weighed materials were mixed with an agate mortar to obtain a raw material composition.

Next, 1 g of the raw material composition was placed into a 45 ml zirconia pot. In addition, 500 zirconia balls (Φ4 mm) were placed into the pot. The pot was completely hermetically closed and installed in a planetary ball mill to perform mechanical milling at a rotational frequency of 510 rpm for 20 hours. Therefore, a sulfide solid electrolyte (amorphous glass) of Reference Example 1 was obtained.

2. Measurement of the Amount of Generated Hydrogen Sulfide 100 mg sample of each of the sulfide solid electrolytes of Example 1, Comparative Example 1 and Reference Example 1 was weighed out. Each of the samples was pressed at a pressure of 5.1 ton/cm$^2$ with a pelleting machine having a pelleting part of 1 cm$^2$ to form a pellet. Then, each pellet was placed in a desiccator (1,950 cc). After the desiccator having the pellet placed therein was once evacuated, an air at a temperature of 25° C. and a humidity of 58% was introduced thereinto. The amount of hydrogen sulfide generated from each pellet in the first 6,000 seconds was measured by a hydrogen sulfide sensor. The results are shown in FIG. 1.

As shown in FIG. 1, each of the sulfide solid electrolytes of Example 1 (represented by black triangle) and Reference Example 1 (represented by black square) was found to generate a lower amount of hydrogen sulfide than the sulfide solid electrolyte of Comparative Example 1 (represented by black diamond). In the case of the sulfide solid electrolyte of Comparative Example, 1, the generated hydrogen sulfide amount increased rapidly as time passed. In the case of the sulfide solid electrolyte of Reference Example 1, the generated hydrogen sulfide amount showed almost no change during the measurement time. In the case of the sulfide solid electrolyte of Example 1, the generated hydrogen sulfide amount decreased as time passed. As a result, the generated hydrogen sulfide amount after 6,000 seconds was the lowest in the case of using the sulfide solid electrolyte of Example 1.

3. Raman Spectroscopy Measurement

Raman spectroscopy measurement was performed on the sulfide solid electrolyte (crystallized glass) of Example 1.

Figure 2:
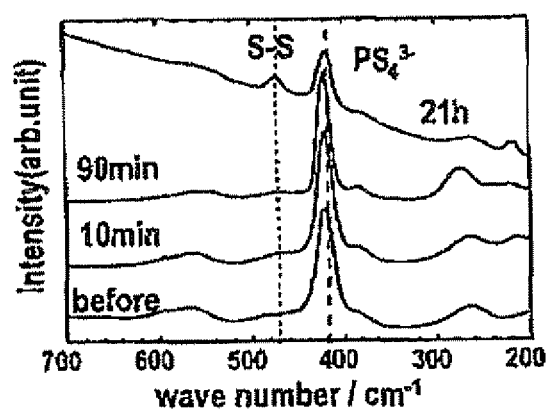
FIG. 2 is a graph showing Raman spectra of the sulfide solid electrolyte of Example 1 before exposed to the air (referred to as "before"), 10 minutes after the exposure ("10 min"), 90 minutes after the exposure ("90 min") and 21 hours after the exposure ("21 h").

FIG. 2 is a graph showing Raman spectra of the sulfide solid electrolyte of Example 1 before exposed to the air (referred to as "before"), 10 minutes after the exposure ("10 min"), 90 minutes after the exposure ("90min") and 21 hours after the exposure ("21 h").

As is clear from FIG. 2, scattering relating to S-S structure (470 cm$^{-1}$) and that relating to PS$_4^{3-}$ (417 cm$^{-1}$) are shown in any of the spectra; however, scattering relating to crosslinking sulfur structure of P$_2$S$_7^4$ (402 cm$^{-1}$) is not included in any of the spectra. From this result, it is believed that a reduction in the amount of generated hydrogen sulfide as described under "2. Measurement of the amount of generated hydrogen sulfide" was achieved.

4. Impedance Measurement

AC impedance measurement was performed on the sulfide solid electrolytes of Example 1 and Reference Example 1. AC impedance measurement was performed under a dry argon atmosphere with an impedance analyzer (model 1260 manufactured by Solartron Analytical) on the frequency range of 10 Hz to 8 MHz. The measurement temperature was 23° C. to 280° C.

Figure 3:
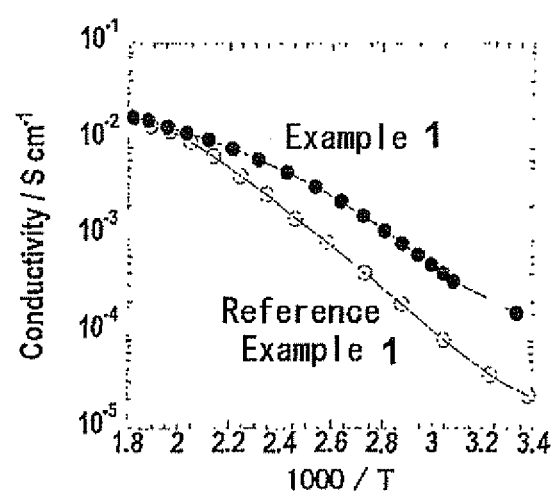
FIG. 3 is a graph showing an Arrhenius plot of the sulfide solid electrolyte of Example 1 (represented by black circle) and that of the sulfide solid electrolyte of Reference Example 1 (represented by white circle).

FIG. 3 is a graph showing an Arrhenius plot of the sulfide solid electrolyte of Example 1 (represented by black circle) and that of the sulfide solid electrolyte of Reference Example 1 (represented by white circle). As is clear from FIG. 3, compared with the sulfide solid electrolyte of Reference Example, 1, the Li$^+$ conductivity of the sulfide solid electrolyte of Example 1 is one digit higher at the maximum and showed a high value of 2×10$^{-4}$ S/cm at 25° C.

From this result, the following are suggested: because the glass having a mole ratio of 75Li$_2$S:15P$_2$S$_5$:10P$_2$O$_5$ has a PS$_4^{3-}$ structure as the base structure, it can be crystallized without containing crosslinking sulfur; moreover, due to the crystallization, non-crosslinking sulfurs in the PS$_4^{3-}$ structure where aligned to form conductive paths, so that the Li$^+$ conductivity which showed a decrease by the addition of oxide P$_2$O$_5$ shows a single-digit increase at the maximum.

The invention claimed is:

1. A sulfide solid electrolyte comprising a crystallized glass represented by the following chemical formula (1):

$$75Li_2S \cdot (25-x)P_2S_5 \cdot xP_2O_5 \qquad (1)$$

wherein:
0<x<25.

2. The sulfide solid electrolyte according to claim 1, wherein the crystallized glass has a crystallinity of 50 to 100%.

3. The sulfide solid electrolyte according to claim 1, having an ortho composition.

4. The sulfide solid electrolyte according to claim 1, wherein the crystallized glass does not comprise a P$_2$S$_7$4− ion.

5. The sulfide solid electrolyte according to claim 1, wherein 0<x≤20.

6. The sulfide solid electrolyte according to claim 1, wherein 0<x≤15.

7. The sulfide solid electrolyte according to claim 1, wherein 5≤x≤20.

8. The sulfide solid electrolyte according to claim 1, wherein 5≤x≤15.

9. A method for producing a crystallized glass, comprising:
preparing a raw material composition comprising Li$_2$S, P$_2$S$_5$ and P$_2$O$_5$ so that a content of Li$_2$S is 75 mol % when a total content of Li$_2$S, P$_2$S$_5$ and P$_2$O$_5$ is 100 mol %;
amorphizing the raw material composition; and
crystallizing a glass obtained by the amorphization by heating;
wherein the crystallized glass comprises a PS$_4^{3-}$ ion but does not comprise a P$_2$S$_7^{4-}$ ion.

10. The method according to claim 9, wherein the raw material composition is amorphized by mechanical milling.

11. A method for producing a crystallized glass, comprising:
preparing a raw material composition comprising Li$_2$S, P$_2$S$_5$ and P$_2$O$_5$ so that a content of Li$_2$S is 75 mol % when a total content of Li$_2$S, P$_2$S$_5$ and P$_2$O$_5$ is 100 mol %;
amorphizing the raw material composition; and
crystallizing a glass obtained by the amorphization by heating.

12. The method according to claim 11, wherein the raw material composition is amorphized by mechanical milling.

* * * * *